May 28, 1968

H. M. GOLD 3,385,998

BATTERY POWER PROTECTION SYSTEM
FOR AUTOMOBILES AND THE LIKE
Filed Dec. 29, 1965

INVENTOR.
HOWARD M. GOLD

BY Salvatore G. Militara
attorney

United States Patent Office 3,385,998
Patented May 28, 1968

3,385,998
BATTERY POWER PROTECTION SYSTEM FOR AUTOMOBILES AND THE LIKE
Howard M. Gold, 1115 100th St., Bay Harbor Island, Miami Beach, Fla. 33154
Continuation-in-part of application Ser. No. 483,614, Aug. 30, 1965. This application Dec. 29, 1965, Ser. No. 517,310
2 Claims. (Cl. 315—80)

ABSTRACT OF THE DISCLOSURE

An ignition system for motor vehicles having a conventional ignition switch consisting of a main, on and starter terminals and pivot means selectively connecting the terminals, a light switch, a battery connected to the main terminal and the light switch, headlights and wire means connecting the light switch and the headlights, a pair of normally open contacts mounted on the wire means, relay means connected to the on terminal, and means connected to the relay means closing the open contacts upon actuating the pivot means to engage the on terminal, energize the relay and close the open contacts to energize the headlights and when the pivot means is at the off position or engaging the starter terminal, the headlights are incapable of being energized.

---

Figure 1:
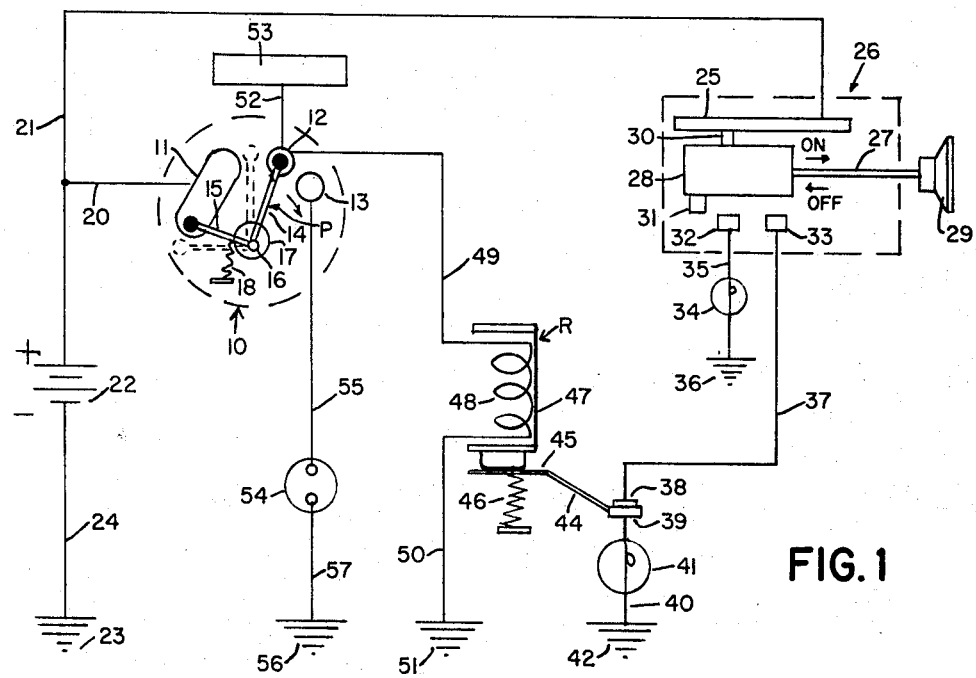

This invention relates to ignition systems for automobiles and the like and is more particularly directed to means for conserving battery power. This application is a continuation-in-part of my Patent No. 3,348,095, for Battery Power Protection System.

A principal object of the present invention is to provide a battery power protective system for an automobile and the like with means for preventing the headlights from being energized when the starter is energized in starting the engine.

Another object of the present invention is to provide an ignition system for an automobile and the like which system prevents an unnecessary drain of battery power when the ignition system is on the "off" or "start" position by permitting the circuit to the headlights to be complete only when the ignition system is at the "on" position.

A still further object of the present invention is to provide a battery power protection system for automobiles and the like which is readily adapted to the conventional ignition systems by the addition of a power relay and a magnetic switch, this change being inexpensive in cost and readily connected.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 2:
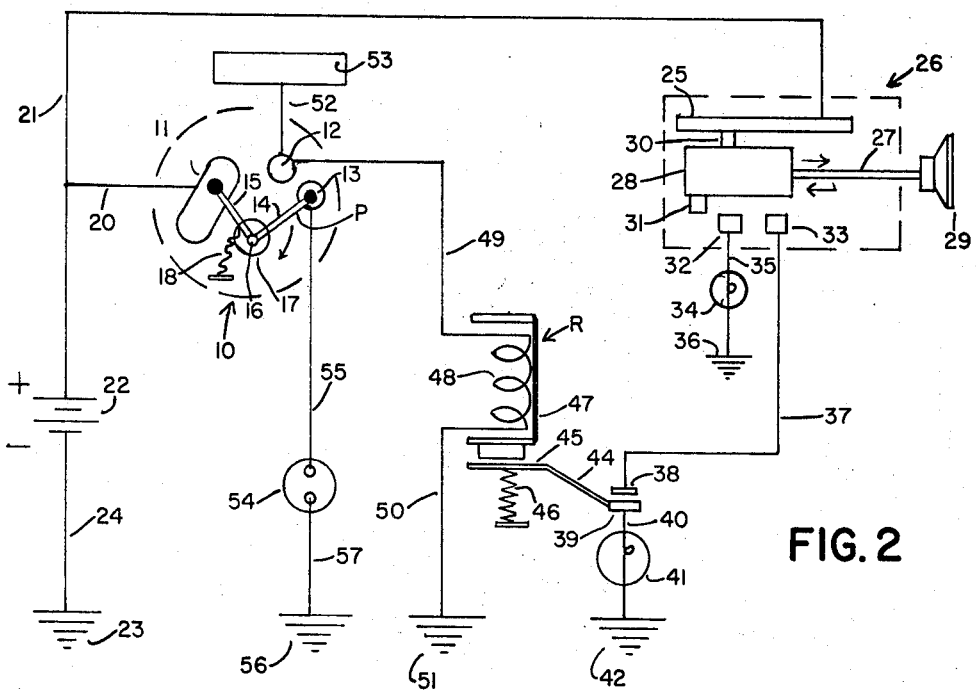

In the drawing:
FIGURE 1 is a schematic diagram of an ignition system embodying my invention with the ignition shown on the "on" position.
FIGURE 2 is a similar view showing the ignition on the "start" position.

Referring to the drawing wherein like numerals are used to designate similar parts throughout the two views the numeral 10 refers to a simple conventional ignition switch consisting of a plurality of stationary terminals, namely a main terminal 11, an "on" terminal 12, a "start" terminal 13 and a pivoted contact member P having arm portions 14 and 15. The pivoted contact member P is rotated about a pivot pin 16 by use of a knob 17. The pivoted contact member P may be turned to one of three positions, "off," "on" and "start" positions. The switch 10 is at the "off" position when the contact arms 14 and 15 have assumed the dotted line position and not in engagement with any of the contact members 11, 12 and 13. The switch 10 is at the "on" position when the pivoted member P has been rotated to the solid line position as shown in FIGURE 1, when the contact members 11 and 12 are engaged by the contact arms 15 and 14 respectively. When the contact arms 14 and 15 have been rotated to the position shown in FIGURE 2, wherein contact arm 15 engages contact 11 and the contact arm 14 engages the contact member 13, the switch 10 is at the "start" position. A coil spring 18 fastened at one end to the switch box 10 is connected at its other end to the pivoted contact arm 15 to return the pivoted contact member P to the "on" position after the pivoted contact member P had been pivoted to the "start" position and then released upon the engine of the automobile having been started.

The stationary contact member 11 is connected by a conductor 20 to a battery conductor 21 that is connected at one end to the positive terminal of a storage battery 22 whose negative terminal is grounded as at 23 by a conductor 24.

The conductor 21 extends to a power contact terminal 25 of a conventional light switch 26. The light switch 26 is provided with a slide shaft 27 on the ends of which is a knob 29 and a body member 28. Contact members 30 and 31 are affixed to the body member 28 for the purpose of making contact with terminals 25 and terminals 31 and 32 as determined by the position of the knob 29. The contact member 30 is in contact relation with the power contact terminal 30 at all positions of the knob 29. With the knob 29 in its fully retracted position as shown by the drawing, the contact member 31 is out of contact relation with both of the terminals 32 and 33. Upon withdrawing the knob 29 of the light switch outwardly to its first or parking light position, the terminal 32 will be engaged by the contact member 31 and when the knob 29 is extended to its extreme outward or headlight position, the contact member 31 will engage the terminal 33.

The terminal 32 is connected to parking lights 34 by a conductor 35, the other terminal of the parking lights 34 being grounded as at 36. A conductor 37 connects the terminal 33 and a contact 38 which is normally positioned in open or spaced relation with a contact 39. The contact 39 is connected by a conductor 40 to the headlights 41 which is grounded as at 42.

The contact 39 is mounted on an arm 44 of a magnetic switch 45, which is influenced for movement in one direction by a coil spring 46 and an armature 47 of a power relay R in the opposite direction. The armature 47 of the power relay R has wound thereon a coil 48 one end of which is connected to a conductor 49 and the other end to a conductor 50 that extends to a ground 51. The conductor 49 extends to a conductor 52 which connects the stationary contact 12 of the ignition switch 10 with the accessories 53 such as the radio and the like.

The stationary contact 13 of the ignition switch 10 is connected to one terminal of a starter solenoid 54 by a conductor 55 while the other terminal is connected to a ground 56 by a conductor 57.

It is to be noted that my battery power protection system does not alter the normal operation of the motor vehicle. In starting the engine of a motor vehicle, the ignition key is rotated by the operator to its extreme position against the spring force 18 with the contact arms 15 and 14 swung to the position shown by FIGURE 2 wherein the contact arms 15 and 14 engage the contact members 11 and 13 respectively. This energizes the starter solenoid 54 causing the engine to be started. While the starter is being energized, the headlights 41 will be on the "off" position because the magnetic switch 45 will not have been energized and the spring 46 will have retracted the contact member 38 and opened the circuit to the headlights 41.

After the engine has been started, the operator releases the key and the spring 18 will rotate the contact arms 14 and 15 to the solid line position shown by FIGURE 1. Now, the contact member 12 will be energized so that the accessories (not shown) connected at 53 will be available. Also, the coil 48 will be energized, whereupon movement of the armature 47 will cause the contacts 39 and 38 to engage each other. Now when the light switch 26 is pulled outwardly and contact 31 engages contact 33, the headlights 41 will be energized. Consequently, the headlights 41 can be energized only when the ignition switch 10 is at the "on" position with the contact arm 15 engaging the contact member 11 and the contact arm 14 engaging the contact member 12. When the ignition switch 10 is on either of the "off" position or "start" position, the headlight circuit is broken at the contact members 38 and 39. The headlights can be energized only when the ignition switch is at the "on" position.

It is readily noted upon observing the wiring diagram that a minimum amount of change in circuitry is required in order to change over the conventional ignition systems now in use in automobiles to my battery power protection system. All that need be done is connect the headlight switch 26 directly to the battery 22 instead of to the accessories 53, add the power relay 45, 46, 47, 48 and switch 38, 39 to the circuit by connecting the power relay to the ignition "on" contact 12 and the switch 38, 39 in the headlight circuit. Such a change in circuit is readily and quickly made resulting in a conservation of battery power and avoiding the possibility of the battery which has sufficient power to start the automobile but fails to do so because the power is being consumed simultaneously therewith by the headlights.

What I claim as new and desire to secure by Letters Patent of the United States is:

1. In an ignition system for an automotive vehicle and the like comprising a battery, an ignition switch having a "main" terminal, an "on" terminal and an engine "start" terminal, pivot means selectively connecting said main terminal to either of said other terminals or to an off position whereby none of said terminals become connected, light switch means, headlights, means connecting said light switch means and said headlights, means connecting said battery to said main terminal and to said light switch means, engine start means, means connecting said last named means and said engine start terminal, normally open contact means mounted in said headlight connecting means preventing said headlights from being energized upon actuation of said light switch means and relay means connected to said "on" terminal and said normally open contact means whereby, upon actuating said pivot means to connect said "main" terminal and said "on" terminal of said ignition switch, said normally open contact means is brought to engaged position and said headlights are capable of being energized upon actuation of said light switch means.

2. The structure as recited by claim 1 wherein said relay means comprises an armature and a coil having one end connected to said "on" terminal of said ignition switch, a magnetic switch mounted in spaced relation to said armature, said magnetic switch having an arm portion connected to one of said normally open contact means, and spring means connected to said magnetic switch yieldingly holding said magnetic switch in spaced relation to said armature and said contact means in an open position.

References Cited
UNITED STATES PATENTS 2,449,338    9/1948    Summersett _____ 315—80
2,913,589    11/1959    Bell _____ 315—83 X JAMES W. LAWRENCE, *Primary Examiner.*

DAVID J. GALVIN, *Examiner.*

P. C. DEMEO, *Assistant Examiner.*